US011593666B2

(12) United States Patent
McCarthy et al.

(10) Patent No.: US 11,593,666 B2
(45) Date of Patent: Feb. 28, 2023

(54) SYSTEM FOR MULTI-TASK DISTRIBUTION LEARNING WITH NUMERIC-AWARE KNOWLEDGE GRAPHS

(71) Applicant: ACCENTURE GLOBAL SOLUTIONS LIMITED, Dublin (IE)

(72) Inventors: Nicholas McCarthy, Dublin (IE); Sumit Pai, Mangalore (IN); Luca Costabello, Newbridge (IE)

(73) Assignee: Accenture Global Solutions Limited, Dublin (IE)

( * ) Notice: Subject to any disclaimer, the term of this patent is extended or adjusted under 35 U.S.C. 154(b) by 330 days.

(21) Appl. No.: 16/899,365

(22) Filed: Jun. 11, 2020

(65) Prior Publication Data

US 2021/0216881 A1    Jul. 15, 2021

Related U.S. Application Data

(60) Provisional application No. 62/959,209, filed on Jan. 10, 2020.

(51) Int. Cl.
| | |
|---|---|
| *G06N 5/02* | (2006.01) |
| *G06N 3/08* | (2006.01) |
| *G06K 9/62* | (2022.01) |
| *G06N 20/00* | (2019.01) |

(52) U.S. Cl.
CPC ............ *G06N 5/02* (2013.01); *G06K 9/6201* (2013.01); *G06K 9/623* (2013.01); *G06K 9/6296* (2013.01); *G06N 3/08* (2013.01); *G06N 20/00* (2019.01)

(58) Field of Classification Search
CPC ............ G06N 5/02; G06N 20/00; G06N 3/08; G06K 9/6201; G06K 9/623; G06K 9/6296
See application file for complete search history.

(56) References Cited

U.S. PATENT DOCUMENTS

| | | | |
|---|---|---|---|
| 2020/0074246 A1* | 3/2020 | Goyal | G06K 9/6274 |
| 2020/0160215 A1* | 5/2020 | Kotnis | G06N 20/00 |
| 2020/0285944 A1* | 9/2020 | Lee | G06N 3/0472 |
| 2021/0081717 A1* | 3/2021 | Creed | G06N 5/022 |

(Continued)

OTHER PUBLICATIONS

Muhan Zhang, "Graph Deep Learning: Methods and Applications" (Year: 2019).*

(Continued)

*Primary Examiner* — Kenny A Cese
(74) *Attorney, Agent, or Firm* — Crowell & Moring LLP (57) ABSTRACT

This disclosure provides methods and systems for predicting missing links and previously unknown numerals in a knowledge graph. A jointly trained multi-task machine learning model is disclosed for integrating a symbolic pipeline for predicting missing links and a regression numerical pipeline for predicting numerals with prediction uncertainty. The two prediction pipelines share a jointly trained embedding space of entities and relationships of the knowledge graph. The numerical pipeline additionally includes a second-layer multi-task regression neural network containing multiple regression neural networks for parallel numerical prediction tasks with a cross stich network allowing for information/ model parameter sharing between the various parallel numerical prediction tasks.

15 Claims, 8 Drawing Sheets

(56) References Cited

U.S. PATENT DOCUMENTS

2021/0158149 A1* 5/2021 Zhang .................... G06N 3/084

OTHER PUBLICATIONS

Li et al., "PGCN: Disease gene prioritization by disease and gene embedding through graph convolutional neural networks" (Year: 2019).*

Zhang et al., "Link Prediction Based on Graph Neural Networks" (Year: 2018).*

* cited by examiner

SYSTEM FOR MULTI-TASK DISTRIBUTION LEARNING WITH NUMERIC-AWARE KNOWLEDGE GRAPHS

CROSS-REFERENCE TO RELATED APPLICATION

This application claims benefit to U.S. Provisional Patent Application No. 62/959,209, filed on Jan. 10, 2020, which is herein incorporated by reference in its entirety.

TECHNICAL FIELD

The present disclosure relates in general to the field of knowledge graphs, and in particular to methods and systems that utilize a multi-task machine learning architecture for predictive analytics.

BACKGROUND

Rapid advances in data organization and storage technologies, driven by immense customer demand, have resulted in the adoption of knowledge graphs. Knowledge graphs may represent entities with disparate characteristics and their complex relationships. It may be advantageous to predict/infer unknown relationships between these entities in the knowledge graphs. Efficient creation, ingestion, information access, and predictive expansion of knowledge graphs may further facilitate their wider spread in various applications.

BRIEF DESCRIPTION OF THE DRAWINGS

The foregoing and other objects, features, and advantages for embodiments of the present disclosure will become apparent from the following more particular description of the embodiments as illustrated in the accompanying drawings, in which reference characters refer to the same parts throughout the various views. The drawings are not necessarily to scale, with emphasis instead being placed upon illustrating principles of the present disclosure.

DETAILED DESCRIPTION

A collection of complex data items may be used for description of various sophisticated application scenarios including but not limited to community networks, social networks, general knowledge networks, industrial and enterprise operations, and the like. These data items may include various physical or abstract entities, concepts, numerals, and complex relationships there between. For example, a social community may be described by various interconnecting entities, concepts and numerals of various types, such as people, places, employers, entertainment venues, ethnicities, municipal agencies, health facilities, service providers, population numerals, date numerals, and the like. A specific example of such community network is described below in relation to FIG. 1. In an industrial operation, for another example, such interconnecting physical or abstract entities, concepts, and numerals may include but are not limited to domain processes, facilities, equipment, sensors/sensor parameters, raw materials, intermediate products, final products, key performance measures, power consumptions, emissions, and regulation compliances, supply chain entities, personnel hierarchies, accounting data items, customers, and the like. Such an industrial operation may be associated with one or more of, for example, chemical synthesis, petroleum refining, semiconductor wafer fabrication, water treatment, electric power production, and the like.

Because of the disparity and complexity of these entity, concept, numeric, and relationship data items, a conventional relational database (e.g., in the form of data tables) may not be suitable as an efficient means for their storage and access. Instead, these data items may be defined and stored in various types of graphic databases. The collection of these data items in a graphic database may represent a graph of knowledge (alternatively referred to as a knowledge graph) that may be visualized as a web of the interconnecting entities, concepts, and numerals. A knowledge graph thus represents a collection of known facts as recorded entities, concepts, and numerals of various types, and relationships there-between. New knowledge such as hidden/missing/unknown relationships/links between the known entities and concepts, or new numeric properties of the known entities and concepts may be derived using machine learning models trained based on the known facts and their correlations in the knowledge graph, thereby expanding the existing knowledge graph.

This disclosure provides methods and systems for predicting such hidden/missing relationships/links and previously unknown numerals. While the prediction of missing links between entities/concepts and prediction of numerals typically take drastically different approaches in machine learning, the methods and systems described in this disclosure integrate a jointly trained symbolic pipeline for predicting missing links and a regression numerical pipeline for predicting numerals with prediction uncertainty in the form of, e.g., numerical standard deviation. The two prediction pipelines use and share embedding vectors of the entities and relationships of the knowledge graph in an embedding space that is trained with the two prediction pipelines. In particular, the methods and systems described below provide an integrated two-layer multi-task prediction model trained from an existing knowledge graph. The first-layer of the multi-task prediction model includes the symbolic pipeline/task and the numerical pipeline/task with a shared embedding space. The embeddings and the other model parameters of the two parallel prediction pipelines are jointly trained by minimizing an aggregation of a symbolic loss function and a numerical regression loss function. The numerical pipeline/task, in addition, includes a second-layer multi-task regression neural network containing multiple parallel regression neural networks for parallel numerical prediction tasks with a cross stich network allowing for information/model parameter sharing between the various parallel numerical prediction tasks. Model parameter dropouts may be further implemented during the training of the two-layer multi-task prediction model as part of the joint training of the entire prediction model.

Figure 1:
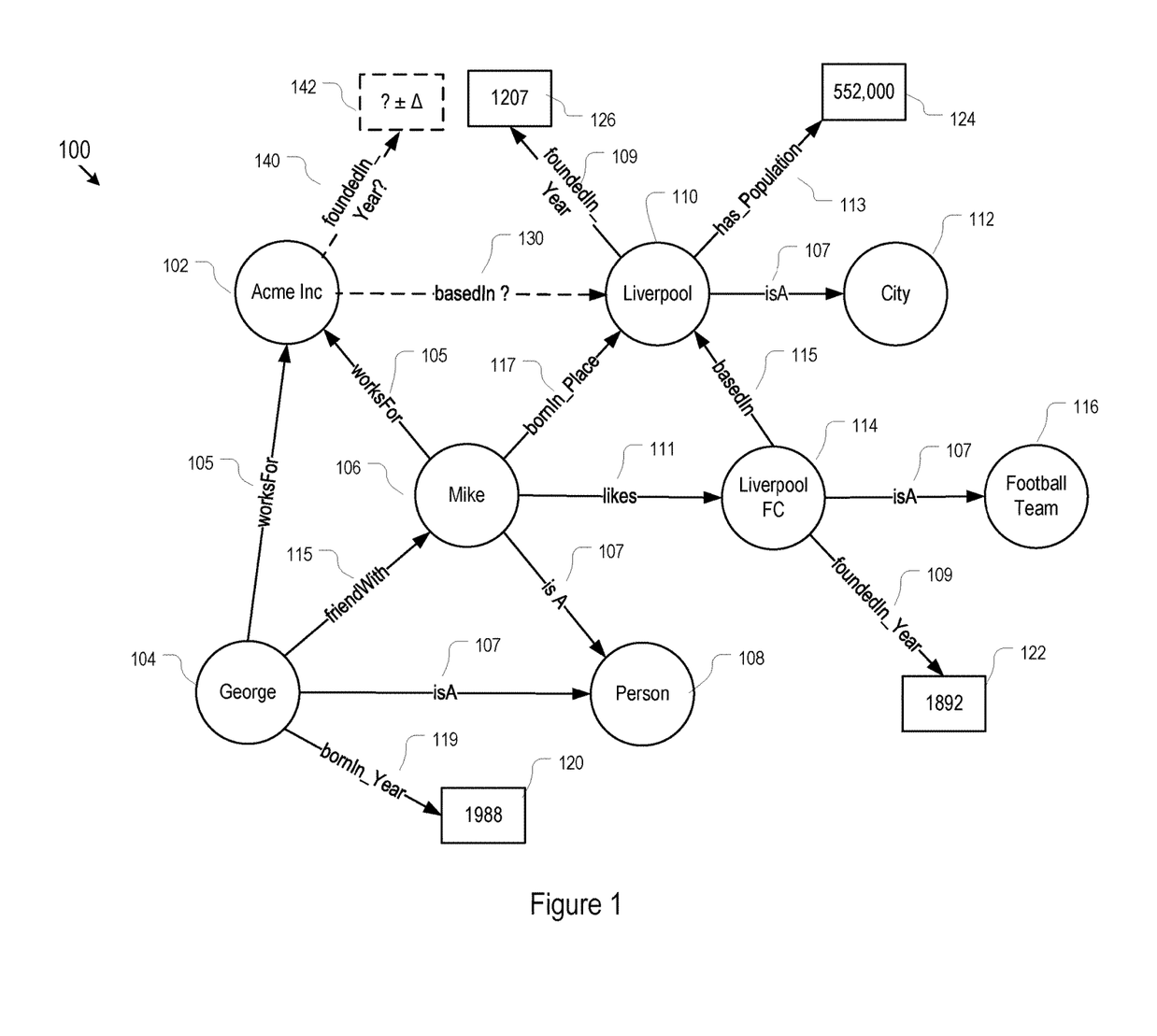
FIG. 1 is an illustration of a knowledge graph comprising various subject-predicate-object triples, each shown as two graphical nodes connected by a linking edge, in accordance with certain embodiments of the present disclosure.

FIG. 1 illustrates a materialized knowledge graph 100 for an example community network in accordance with certain embodiments of the present disclosure. The knowledge graph 100 may be established from known facts according to an underlying schema for the knowledge graph. Such a knowledge graph schema may function as a blueprint for expressing a set of predefined types/classes of entities, concepts, numerals, and relationships. A knowledge graph schema may be materialized or instantiated into an actual knowledge graph with specific entities, concepts, numerals, and relationships of the various types/classes as specified in the knowledge graph schema. A knowledge graph schema may be described in various different formats. For example, a knowledge graph schema may be constructed based on a Resource Description Framework (RDF) to provide a data model that represents the knowledge base as a collection of expressions in the form of subject-predicate-object. A subject in the schema may be any one of the predefined entity or concept types/classes whereas an object in the schema may be any one of the predefined entity, concept, or numerical types/classes. A predicate in the schema may be any one of the predefined types/classes of relationship. The example knowledge graph 100 of FIG. 1 may be obtained by materializing or instantiating an underlying schema with specific entities, concepts, numerals, and relationships, where the specific entities, concepts, and numerals are represented as nodes of the knowledge graph 100 representing various subjects and objects, and the specific relationships or predicates are represented as edges of the knowledge graph 100.

The example materialized knowledge graph 100 of FIG. 1 includes various entities, concepts, numerals, and relationships of various types. For example, the knowledge graph 100 may include entities of type person, such as "George" 104 and "Mike" 106, entities of type city, such as "Liverpool" 110, entities of type football team, such as "Liverpool FC" 114, and entities of type enterprise, such as "Acme Inc" 102. The knowledge graph 100 may also include numerals of type year, such as 126, 120, and 122, and numerals of type population, such as 124. Example concepts included in the knowledge graph 100 includes "person" 108 and "city" 112. The knowledge graph 100 further includes entity or concept relationships such as "worksFor" 105, "friendWith" 115, "likes" 111, "bornIn_Place" 117, "basedIn" 115, and "isA" 107, and numerical relationships such as "foundedIn_Year" 109, "bornIn_Year" 119, "has_Population" 113. While an entity as illustrated in FIG. 1 represents objects of more concrete nature whereas a concept represents more of an abstraction, they are not differentiated with respect to the knowledge graph data structure used in this disclosure. For simplicity, the various entities and concepts of the knowledge graph are herein collectively referred to as entities.

The knowledge graph 100 of FIG. 1 essentially represents a collection of materialized subject-predicate-object triples following the underlying schema, where a subject may be any one of the entities (including the various concepts) represented as a collection E, a predicate may be any one of the relationships collectively referred to as R, and an object may be any one of the entities within E or any one of the numerals collectively referred to as V (standing for numerical "V"alue). For example, the knowledge graph 100 of FIG. 1 includes several triples of the form "person" (subject) "WorksFor" (predicate) "enterprise" (subject), such as "George" (104) "worksFor" (105) "Acme Inc" (102), and "Mike" (106) "worksFor" (105) "Acme Inc" (102). For another example, the knowledge graph 100 includes several triples of the form subject-"isA"-object, such as "Mike" (106) "isA" (107) "Person" (108), "George" (104) "isA" (107) "Person" (108), "Liverpool" (110) "isA" (107) "City" (112), and "Liverpool FC" (114) "isA" (107) "Football Team" (116). The knowledge graph 100 further includes several triples of the form subject-"foundedIn-Year"-object, such as "Liverpool" (110) is "foundedIn_Year" (109) "1027" (126), and "Liverpool FC" (114) is "FoundedIn_Year" (109) "1892" (122). The knowledge graph 100 further includes other subject-predicate-object triples as illustrated in FIG. 1.

These triples may be extracted from the knowledge graph 100 and may each be represented by:

$$t=(s,p,o)$$

where s is the subject, o is the object, and p is the predicate. These triples may be divided into two different categories: symbolic triples and numerical triples. A symbolic triple may represent a symbolic fact whereas a numerical triple may represent a triple involving numerical values as its object. For a symbolic triple, the subject denoted by s and object donated by o may be any one of the entities E described above, and the predicate may be referred to as a symbolic predicate or symbolic relationship $p_{sym}$. For a numerical triple, the subject s may be any one of the entities within E, whereas the object may be a numerical value x among the numerals V, and the predicate may be referred to as a numerical predicate or relationship $p_{num}$. As such, a symbolic triple and a numerical triple may be respectively represented by:

$$r_{sym}=(s,p_{sym},o), \text{ and}$$

$$r_{num}=(s,p_{num},x).$$

The ensemble of the symbolic triples and numerical triples included in the knowledge graph 100 may be represented by:

$$R_{sym}=\{(s,p_{sym},o)\}^M, \text{ and}$$

$$R_{num}=\{(s,p_{num},x)\}^N$$

Where M and N represent the number of symbolic triples and numerical triples included in the knowledge graph, respectively. The ensembles of symbolic triples and numerical triples $R_{sym}$ and $R_{num}$ constitute the entire set of known facts in the knowledge graph 100.

Unknown facts and implied knowledge from various correlations within the known symbolic and/or numerical triples may be derived, discovered, or predicted using various trained machine learning tasks. In a first type of knowledge discovery task, referred to as a symbolic prediction task, machine learning models may be trained to predict missing relationships/links between entities and concepts of the knowledge graph, thereby expanding the knowledge graph with previously unknown symbolic triples. In a second type of knowledge discovery task, referred to as a numerical prediction task, machine learning models may also be trained to predict a new association of a known numerical relationship $p_{num}$ with a known entity within E and to predict a corresponding numerical value and a quantification of an uncertainty of the numerical prediction, thereby deriving previously unknown numerical triples in the knowledge graph. These two example types of knowledge discovery tasks are further illustrated in FIG. 1. For example, a symbolic relationship 130 of "basedIn" between the entities "Acme Inc" 102 and "Liverpool" 110 may be discovered and predicted based on the various correlations between the known triples in the knowledge graph. For another example, numerical relationship "foundedIn_Year" 140 may be predictively associated with entity "Acme Inc" 102 and a corresponding numerical value 142 may be predicted with uncertainty based on the various correlations between the known triples in the knowledge graph.

Figure 2:
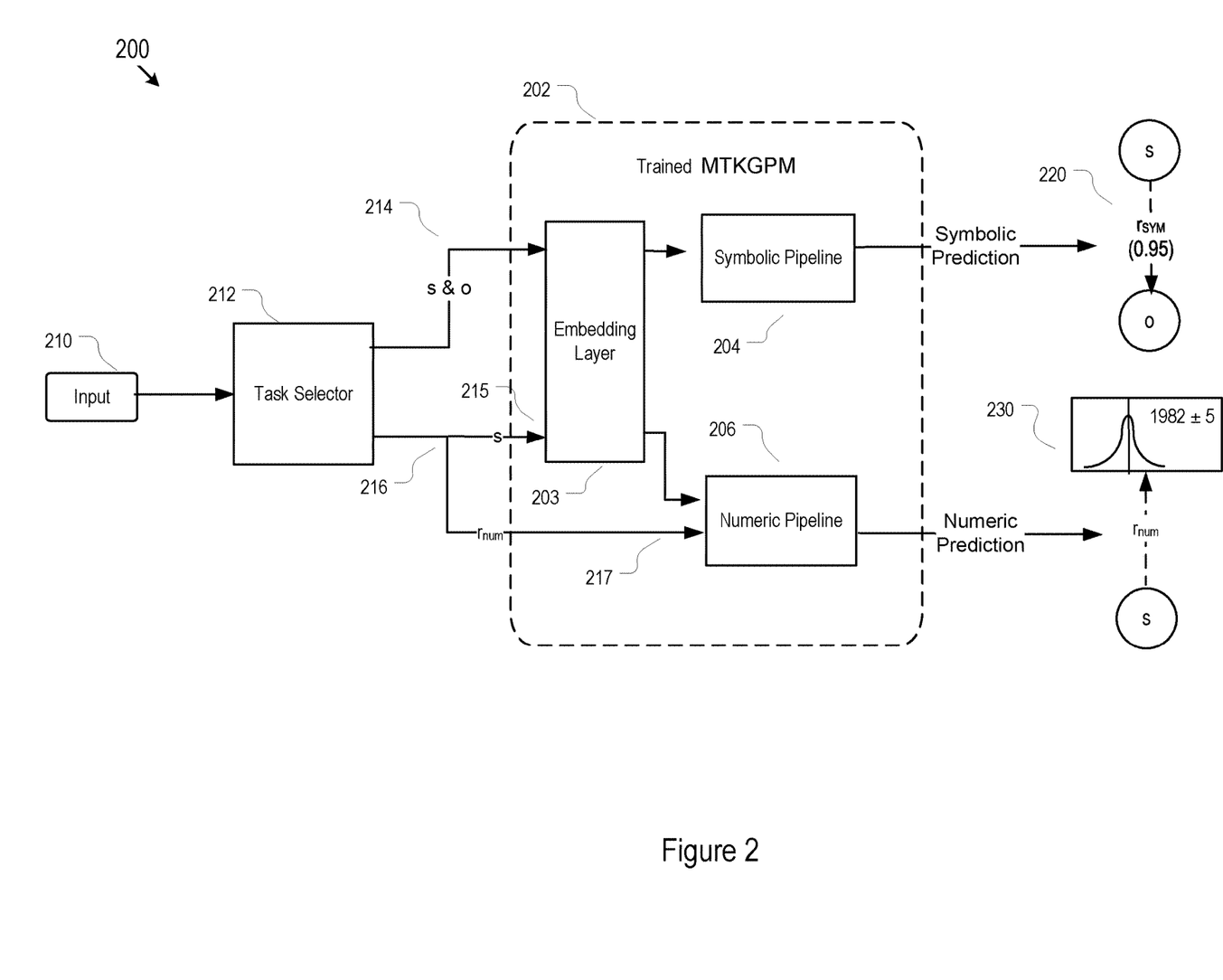
FIG. 2 illustrates a schematic process diagram for prediction of missing links between entities and missing numerical properties of entities with prediction uncertainty using a trained multi-task knowledge prediction model, in accordance with certain embodiments of the present disclosure.

In accordance with some implementations of this disclosure, the symbolic prediction task and the numerical prediction task may be performed by a trained multi-task knowledge graph prediction model (MTKGPM), as shown by 202 in FIG. 2. The MTKGPM 202 may be alternatively referred to as a pre-trained predictive model for the knowledge graph. The example MTKGPM 202 of FIG. 2 includes an embedding layer 203, a symbolic task pipeline 204 (alternatively referred to as a symbolic pipeline) and a numerical pipeline 206 (alternatively referred to as a numerical pipeline). The embedding layer 203 may include trained parameters representing the various entities and predicates in an embedding space. While the embedding space and the embedding vectors for the entities and relationships of the knowledge graph are part of the training model parameters in the symbolic pipeline and the numerical pipeline when the MTKGPM 202 is jointly trained (as shown below in FIGS. 4-7, they may be used, once trained, as the embedding layer 203 for looking up corresponding embedding vectors of particular inputs to the MTKGPM 202. The embedding layer 203 thus performs a mapping in the trained MTKGPM 202 from entities and predicates of the knowledge graph to embedding vectors as described in more detail bellow in relation to FIG. 3. The symbolic pipeline 204 and the numerical pipeline 206 may be connected to the embedding layer 203. Each of the symbolic pipeline 204 and numerical pipeline 206 may include various trained parameters such as weight parameters and regression parameters, and are adapted to process input 210 and/or embedding vectors of the input 210, and the other trained parameters to generate predictions. The symbolic task pipeline 204 is responsible for symbolic predictions, as shown by 220, whereas the numerical pipeline 206 is responsible for prediction of numerals and their predictive uncertainty, as shown by 230.

As further shown in FIG. 2, entities and/or predicates of the knowledge graph may be passed as input 210 to the MTKGPM 202 via a task selector 212. Within the MTKGPM 202, the input 210 as processed by the task selector 212 may be mapped by the embedding layer 203, and dispatched to either the symbolic pipeline 204 or the numerical pipeline 206. For example, a subject s and an object o may be extracted by the task selector 212 and provided to the embedding layer 203 which maps the s and o into embedding vectors, as shown by 214. The embedding vectors are then processed by the symbolic task pipeline 204. The symbolic task pipeline 204 may provide a prediction of a missing link between s and o, as shown in 220. For example, the symbolic pipeline 204 may identify the most probable relationship between the input subject s and an object o among the various symbolic predicates. In particular, the symbolic pipeline 204 may predict scores (e.g., plausibility scores) of one or more predicates of the knowledge graph for linking the subject s and an object o, and select the predicate with the highest score or predicates with scores higher than a predefined plausibility threshold. The symbolic pipeline 204 is thus capable of predicting new symbolic triples that may be previously unknown (or missing). Such new symbolic triples may be added to the knowledge graph to expand the existing knowledge.

Likewise, a numerical prediction task may be selected by the task selector 212 and dispatched to the numerical pipeline 206 for numerical value prediction. For example, a subject s and a numerical predicate $r_{num}$ may be provided to the numerical pipeline 206 for predicting a numerical value for the subject s of the type $r_{num}$, as shown by 216. The subject s, for example, may be first processed by the embedding layer 203 for mapping into the embedding space before being processed by the numerical pipeline 206, as shown by 215. The numerical predicate, $r_{num}$, for another example, may be directly passed to the numerical pipeline 206, as shown by 217. The numerical pipeline 206 may further process the subject s in the embedding space and the numerical predicate $r_{num}$ to predict a numeric value for the subject s of type $r_{num}$ with a prediction uncertainty, as shown by 230. In some other applications, only the subject s may be input to the numeric pipeline 206 through the embedding layer 203. The numerical pipeline 206 may identify a plurality of numerical values for the subject s with respect to various numerical predicates of the knowledge graph with corresponding prediction uncertainties. The numerical pipeline 206 may, for example, determine one or more numerical predicates with smallest uncertainty or with uncertainty less than a predetermined uncertainty threshold as plausible numerical predictions. The numerical pipeline 206 is thus capable of predicting new numerical triples that are previously unknown. Such new numerical triples may be added to the knowledge graph to expand the existing knowledge.

In some implementations, as described in more detail below in relation to FIG. 7, the numerical pipeline 206 may be a multi-task pipeline including multiple parallel regression neural networks. As such, the trained MTKGPM 202 may include at least two levels of multi-tasking: a first multi-task level between the symbolic pipeline and numerical pipeline, and a second multi-task level within the numerical pipeline. Model parameters of both levels of multiple tasks may be jointly trained based on an aggregated loss function, as described in more detail below in relation to FIG. 4. Some model parameters may be directly shared among the various tasks at both levels, as illustrated below in relation to FIGS. 4. Further, information sharing between the various multi-task neural networks in the numerical pipeline may be accomplished using a cross stich network mechanism, as illustrated below in relation to FIG. 7.

Figure 3:
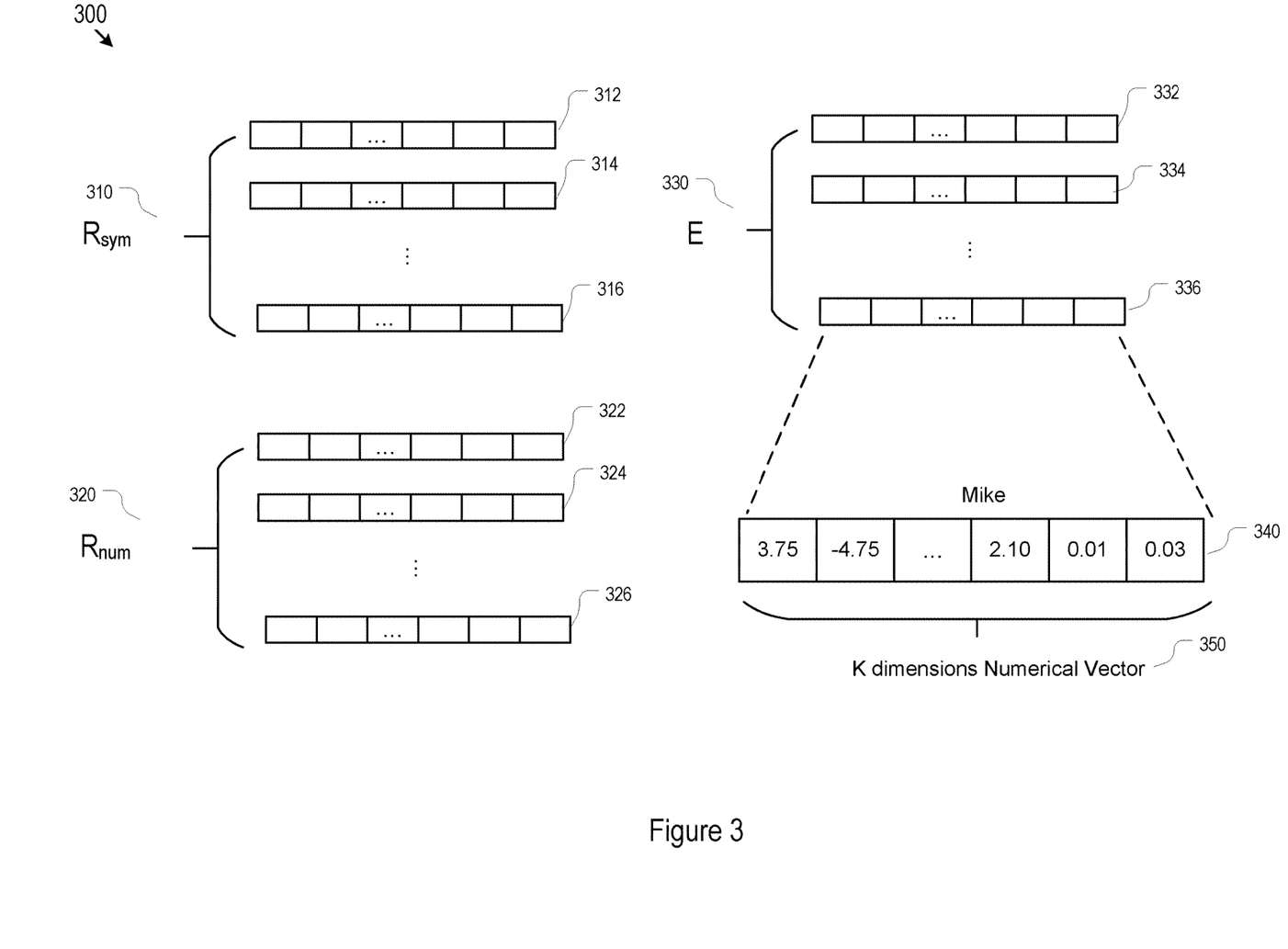
FIG. 3 illustrates exemplary embedding vectors representing entities and relationships of a knowledge graph, in accordance with certain embodiments of the present disclosure.

The MTKGPM 202 of FIG. 2 may be configured to process one or more input entities and relationships of the knowledge graph as subjects, predicates or objects in an embedding space of a predetermined number of dimensions rather than their original forms, as shown in FIG. 3. Specifically, FIG. 3 illustrates a collection 330 of embedding vectors 332, 334, and 336 for the entities E of the knowledge graph, a collection 310 of embedding vectors 312, 314, and 316 for symbolic relationships $R_{sym}$ of the knowledge graph, and a collection 320 of embedding vectors 322, 324, and 326 for numerical relations $R_{num}$ of the knowledge graph. The size of the predetermined number of dimensions for these embedding vectors may be configurable. For example, the embedding space may be a k dimension vector space, as shown by 350, where k can be any integer (e.g., k may be between 10 and 10,000). As such, an embedding vector as illustrated in FIG. 3 for an entity or relationship may correspondingly include 100-1000 components, as represented by the boxes for the embedding vector 340. Values for each of these embedding vectors may be randomly initialized, as shown by the example entity embedding vector of 340. As described in more detail below, the randomly initialized embedding vectors for the entities and relationships may be determined as model parameters through the joint training of the symbolic pipeline 204 and numerical pipeline 206 of the MTKGPM 202 of FIG. 2. Such trained embeddings are used by the embedding layer 203 of FIG. 2 for mapping entities and relationships into the embedding space.

Figure 4:
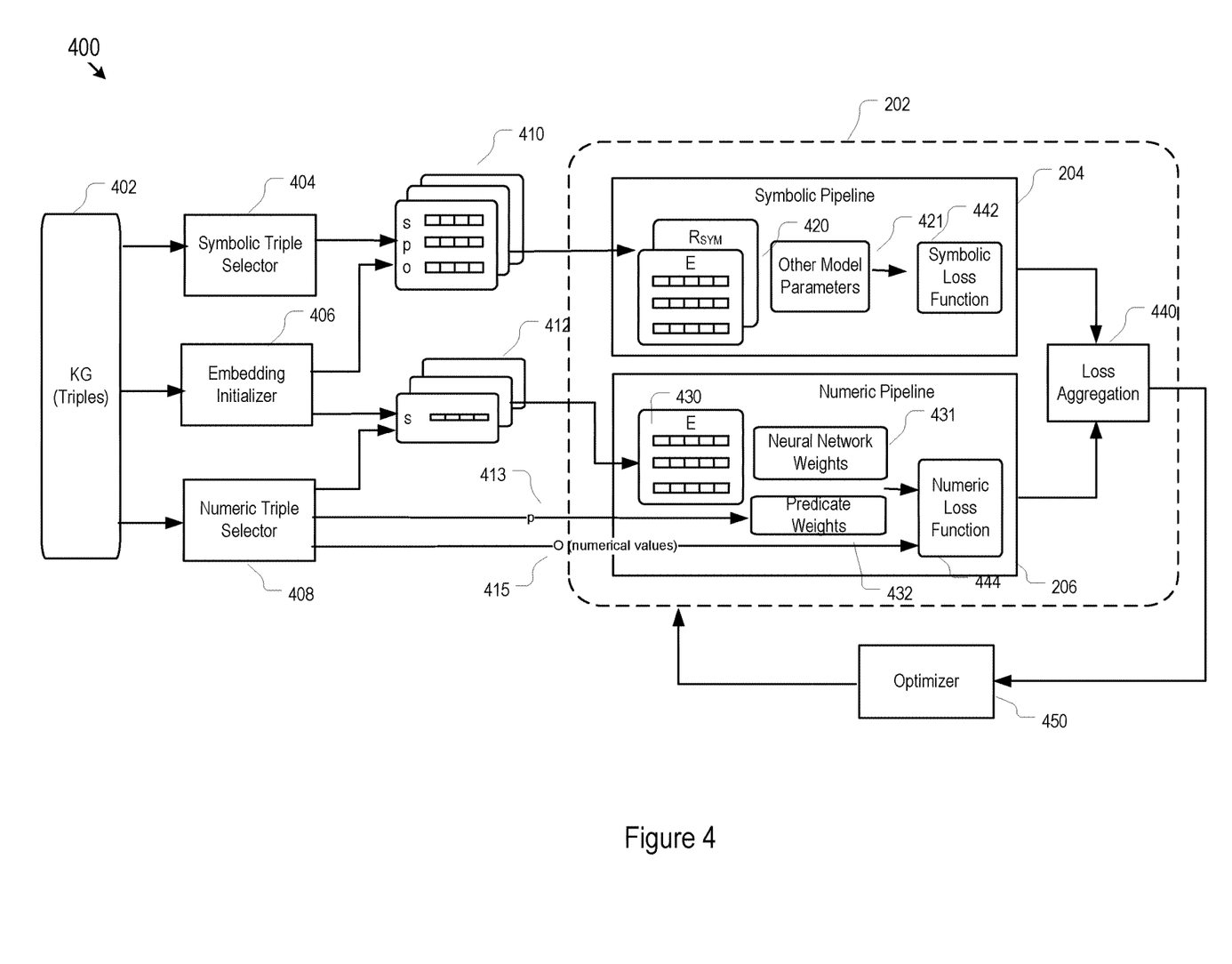
FIG. 4 illustrates a schematic process diagram for a multi-task knowledge prediction model for predicting missing links between entities and missing numerical properties of entities with prediction uncertainty, and a logic flow for training the multi-task knowledge prediction model based on an existing knowledge graph, in accordance with certain embodiments of the present disclosure.

FIG. 4 illustrates a joint training process 400 of the MTKGPM 202. The training set of triples may be extracted from the existing knowledge graph, as shown in 402. Specifically, the triples in the existing knowledge graph may be divided into a training set for training the MTKGPM 202 and a testing set for testing and validating the trained MTKGPM. The training set of triples may be provided to an embedding initializer 406, which initializes the various objects, subjects, and predicates in the training set of triples into, for example, random embedding vectors as illustrated in FIG. 3.

The training set of triples are further processed by a symbolic triple selector 404 and a numerical triple selector 408 to extract individual symbolic triples for processing by the symbolic pipeline 204 of the MTKGPM 202, and individual numerical triples for processing by the numerical pipeline 206 of the MTKGPM 202. For example, each symbolic triple with its subject, predicate, and object as embedding vectors, as shown by 410, are selected from the training set triples and passed into the symbolic task pipeline 204. For each numerical triples, the subject as an embedding vector and the unembedded predicate and object (numerical value) are passed to the numerical pipeline 206, as shown by 412, 413, and 415. Each of numerical predicates 415, for example, may be represented as a set of trainable predicate weight parameters (or weights) 432 of the numerical pipeline 206.

As shown in FIG. 4, the training model parameters in the symbolic task pipeline 204 and the numerical pipeline 206 may include but are not limited to the entity embeddings 420 (embeddings for the subjects, predicates, and objects of symbolic triples) and 430 (subjects of numerical triples) and other model parameters 421 of the symbolic task pipeline 204, and subject embeddings 430 and neural network weight parameters (or weights) for the numerical pipeline 206. Loss functions may be calculated for each of the two pipelines, referred to as a symbolic loss function 442, and numerical loss function 444 in FIG. 4. The symbolic loss function 442 quantifies symbolic prediction errors by comparing predictions of the symbolic task pipeline 204 to actual symbolic relationships indicated in training symbolic triples (in the embedding space). The numerical loss function 444 may be constructed as a regression loss that quantifies numerical prediction errors by comparing numerical predictions from the neural networks of the numerical pipeline 206 to actual numerals indicated in the training numerical triples (in value).

As further shown by 440 in FIG. 4, the symbolic loss function 442 and numerical loss function 444 are aggregated to calculate a joint loss. Such a joint loss is minimized iteratively by an optimizer 450 based on, for example, stochastic gradient descent techniques (e.g., Adagrad, Adadelta, RMSprop, Adam, AdaMax, Nadam, AMSGrad, and the like). The iterations shown by arrow 451 are performed through all triples of the training triple set, and for each triple of the training set triples, the optimization process iterates for adjusting the training parameters of the MTKGPM 202 to minimize the joint loss.

As further shown in FIG. 4, the symbolic pipeline 204 and numerical pipeline 206 share at least some entity embedding parameters. As shown further below in relation to FIG. 7, the numerical pipeline 206 may include parallel multi-task regression neural networks each associated with one of the numerical predicates (and the corresponding predicate weights) and an information sharing between the parallel neural networks using a cross stich network.

The symbolic task pipeline 204 may be based on relational learning. Basic techniques and frameworks that may be relied on by the symbolic task pipeline 204 for relational learning based on embedding the symbolic triples may include but are not limited to knowledge graph embeddings (KGE), such as the TransE model, RESCAL, DistMult, ComplEx, and ConvE. While the disclosure herein are based on embeddings of the knowledge graph triples, other prediction techniques may be used. For example, the symbolic task pipeline 204 may be alternatively based on graph neural networks (GNN), such as Graph Convolution Network (GCN), weighted graph convolution network (WGCN), and GraphSAGE. Furthermore, the symbolic pipeline 204 may be alternatively based on techniques such as node representation learning (NRL).

Figure 5:
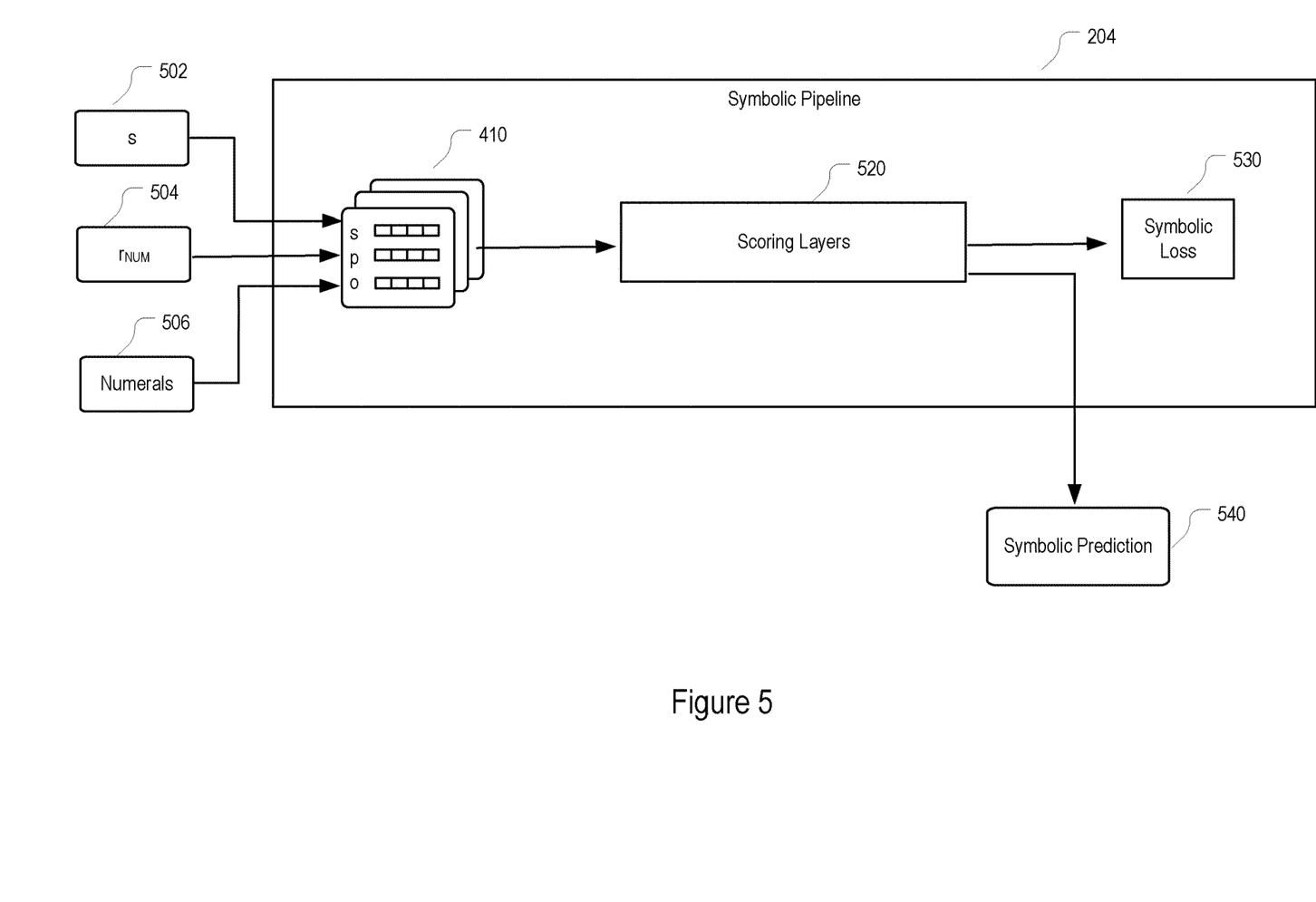
FIG. 5 illustrates a schematic process diagram for the symbolic pipeline of the multi-task knowledge prediction model of FIG. 4 for predicting missing links between entities, in accordance with certain embodiments of the present disclosure.

FIG. 5 further illustrates more details of an example symbolic pipeline 204 of FIG. 4 based on relational learning using embeddings of symbolic triples. FIG. 5 shows that the symbolic pipeline 204 may be designed to process a training symbolic triple, e.g., a subject 502, a symbolic predicate 504 and an object 506 to generate a symbolic loss 530. In particular, the example symbolic pipeline 204 illustrated in FIG. 5 includes one or more scoring layers 520 for evaluating the input symbolic triple in the embedding space. The symbolic loss 530 may be calculated based on scores generated by the scoring layers 520 as a symbolic prediction loss in the embedding space of the entities and relationships of the knowledge graph. The symbolic loss accumulated over input triples, or the symbolic loss function, may be denoted as $J_{sym}$. Such a loss function may be implemented, for example, as a pair-wise loss function, a negative log-likelihood (NLL) loss function, a self-adversarial loss function, or the like. In the particular example of FIG. 5, the loss function $J_{sym}$ is implemented as a pair-wise loss function, defined and calculated as follows:

$$J_{pairwise\ loss} = \Sigma_{t \in E}[\gamma + f(t^-) - f(t^+)]_+$$

where $f( )$ represents the scoring function implemented by the scoring layers 520. The pairwise loss function in $J_{pair\ wise\ loss}$ include false symbolic triple terms $f(t^-)$ and true symbolic triple terms $f(t^+)$. Minimization of this pairwise loss function promotes predictions that are consistent with known true facts (known symbolic triples) and suppresses false predictions. As such, the training data set may also include triples that are known to be non-facts and are thus labelled as false triples. As described above, the input entities and symbolic predicates of the training triples are initialized randomly in the embedding space and the various embedding vectors are determined and optimised during the iterative training process. As shown above in FIG. 3, each entity e in the entity set E or symbolic relation r in the symbolic relation set $R_{sym}$ may be mapped to a k-dimensional vector of real numbers. This may be represented as follows:

$$\forall e \in E, e \rightarrow <x^0 \ldots x^k>$$

$$\forall r \in R_{SYM}, r \rightarrow <x^0 \ldots x^k>$$

In some implementations, the scoring function $f(t)$ may be used to calculate a score for a triple t in the embedding space, representing a likelihood of such triple being a true fact. For example, the scoring function may be implemented based on TransE, RESCAL, DistMult, ComplEx, and/or ConvE. As one example, the scoring function may be implemented as follows:

$$f(t) = \|s + p - o\|_2.$$

In this particular example, the scoring function of a triple t may be calculated using the embedding vectors of the subject (s), symbolic predicate (p), and object (o) of the triple t. The difference between the subject embedding vector s and the object embedding vector o in the embedding space, i.e., (s-o), represents a transposition needed from the object to the subject in the embedding space. The example scoring function above essentially represents an amount of mismatch between such a transposition and the embedding vector of the symbolic predicate, p. Such an example scoring function thus evaluate how close does the predicate p function as a transposition between the subject s and the object o in the embedding space. A smaller score obtained from such a scoring function indicates a closer match between the transposition from the object o to the subject s with the predicate p in the embedding space. Thus, the loss function above using such a scoring function, when being minimized by adjusting the embedding vectors of the entities and the symbolic relationships of the knowledge graph during training, forces the symbolic pipeline 204 to converge to a set of entity and symbolic relationship embeddings that provide optimally matching between subject-to-object transposition and symbolic predicate for true triples in the training set (known symbolic facts in the knowledge graph). As described above, the optimization of the symbolic loss function is achieved through an optimization of the joint or aggregated loss function 440 of FIG. 4 in a joint training process with the numerical pipeline 206 that shares at least some entity embeddings as training parameters common to both prediction pipelines.

As shown by 540 of FIG. 5, such a symbolic pipeline 204, once jointly trained with the numeric pipeline 206 of FIG. 4, may be provided a triple not existed in the current knowledge graph as an input, and would generate a prediction of a score of such a triple by calculating its scoring function using the trained embedding vectors for the subject, object, and predicate in the input triple. A score smaller than a predefined threshold, for example, indicates a sufficiently close match between the transposition from the object to the subject and the predicate in the embedding space, and thus a high likelihood that such input triple is true and can be added to the knowledge graph as an expanded new fact. The symbolic pipeline, for another example, may process a subject-object pair and predict the most probably predicate among the known predicates of the knowledge graph that could be used to link the subject and the object (a missing link). If the mismatch between the object-to-subject transposition and such a predicate in the embedding space is sufficiently low (in other words, the scoring function of the subject-predicate-object triple is lower than a predetermined threshold), the subject, object, and the predicate may form a new triple that is considered plausible and that can be added to the knowledge graph as newly expanded fact.

Figure 6:
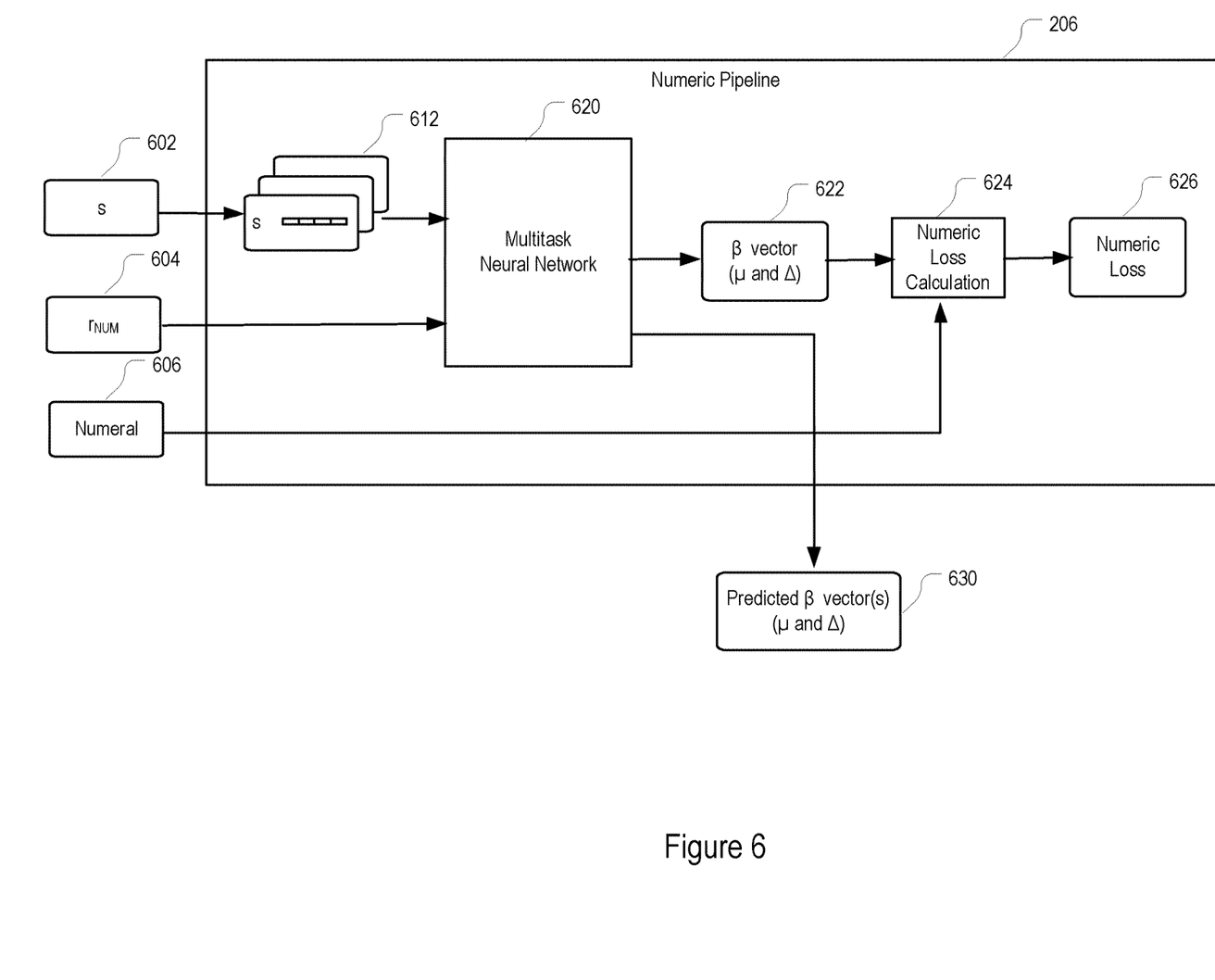
FIG. 6 illustrates a schematic process diagram for the numerical pipeline of the multi-task knowledge prediction model of FIG. 4 for predicting numerical properties of entities with prediction uncertainty, in accordance with certain embodiments of the present disclosure.

FIG. 6 further shows more details of an example numerical pipeline 206 of FIG. 4 in accordance with some embodiments of this disclosure. During the training process, the numeric pipeline 206 may receive input training numerical triples. For example, a subject 602 of a training numerical triple is mapped into the embedding space 612 and its embedding vector is shared with the symbolic pipeline 204 described above and is optimized with other embedding vectors and other model parameters via the joint training of the numerical pipeline 206 and the symbolic pipeline 204. The embedding 612 of the subject and the numerical predicate 604 of the input training numerical triple are processed by a multi-task neural network 620. The output of the multi-task neural network 620 may a numerical prediction vector β 622 comprising both a numerical value μ and an uncertainty α associated with the input subject 602 and numerical predicate 604. Such a vector may be used in conjunction with the numeral 606 of the input training numerical triple in a regression numerical loss calculation process 624 to obtain a numerical predication loss 626. As shown by 630, once the numerical pipeline 206 and symbolic pipeline are jointly trained, the multi-task neural network 620 is used to output one or more predicted β vectors for an input subject or a pair of subject and numerical predicate, as described above in relation to FIG. 2.

In some example implementations, the multi-task neural network 620 may include a plurality of parallel neural networks, each associated with one of the numerical predicates of the knowledge graph. As such, each of the parallel neural networks, once trained, provides a prediction of a numerical value with respect to the corresponding numerical predicate. Thus, for each input subject, the multi-task neural network 602 is capable of predicting numerical values corresponding to all numerical predicates with prediction uncertainties. Scores of these numerical predictions may be indicated by the uncertainties. Further, the plurality of parallel neural networks within the multi-task neural network 620 may be designed to share information via, for example, a cross stitch network. In addition, parameter dropout may be implemented during the training of the multi-task neural network 620. For example, during one or more training iterations, randomly chose weight parameters may be dropped.

Figure 7:
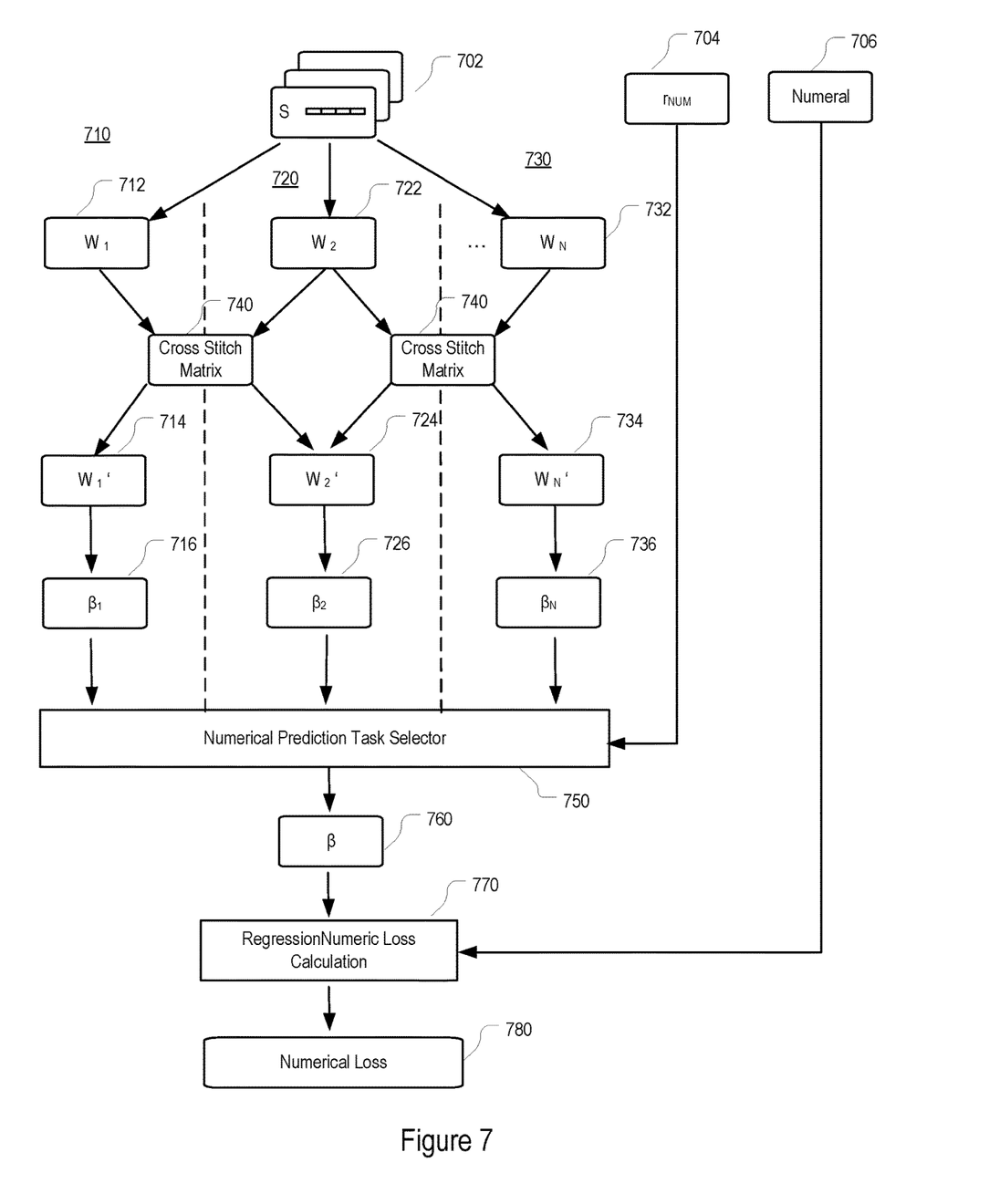
FIG. 7 illustrates a schematic process diagram for the multi-task regression neural network that may be included in the numerical pipeline of the multi-task knowledge prediction model shown in FIG. 6, in accordance with certain embodiments of the present disclosure.

FIG. 7 shows an example implementation of the multi-task neural network 620 of FIG. 6. As shown in FIG. 7, the example multi-task neural network 620 includes parallel regression neural networks 710, 920, and 730, each associated with one of the numerical predicates of the knowledge graph. As shown by 702, each input subject S is mapped to the k-dimensional embedding space:

$$\forall S \in E, S \rightarrow <x^0 \ldots x^k>$$

The embedding vector $<x^0 \ldots x^k>$ is determined as training parameters jointly with the symbolic pipeline, as described above. Further, as shown by 712, 722, and 732, each numerical predicate is mapped to a set of weights, $W_r$, wherein r=1, N and N represents the number of numerical predicates (or the number of parallel regression neural networks 710, 720, and 730. Each of the set of $W_r$ includes a plurality of weight parameters (or weights), $$r \to W_r = \{W_r^1, W_r^2, \ldots, W_r^n\}.$$

The weights may be implemented as containing one or more weight layers of different sizes.

As further shown in FIG. 7, a cross stitch network 740 may be included for information sharing among the multiple parallel regression neural networks (or prediction tasks). The cross stitch network 740, for example may include a set of matrix A of weight parameters:

$$A = \{\alpha_{ab}\}, a, b \in [0 \ldots N]$$

Each of these matrix of weights is used for information sharing between task a and b. For example, the cross stitch matrix between the first numerical task 712 and the second numerical task 720 may be denoted as $\alpha_{12}$. Each cross stitch matrix may be a k by k matrix, initialized as an identity matrix and optimized during the training process.

$$(\alpha_{ab})_{ij} = \begin{bmatrix} 1 & \cdots & 0 \\ \vdots & \ddots & \vdots \\ 0 & \cdots & 1 \end{bmatrix}, i, j = 1, \ldots k$$

The cross stitch network 740 allows information from one numerical prediction task to influence another numerical prediction task and such influence is determined through the joint training process described above.

For example, the set of weights $W_1$ 712 of FIG. 1 for the numerical task 710 may be influenced by numerical task 720 via the cross stick matrix $\alpha_{12}$ (while only the influence from the numerical task 720 is shown in FIG. 7, influences on the numerical task 720 from other numerical tasks are similarly treated using the corresponding cross stitch matrices). Specifically, the set of weights $W_1$ 712 is transformed into a set of cross stitched weights $W_1'$ 714. Other sets of cross stitched weights as shown by 724 and 734 are similarly generated for other numerical tasks. A set of numerical β vectors each containing a numerical value and a numerical uncertainty may be generated from the cross stitched weights for each numerical task, as shown by 716, 726, and 736.

During the joint training process, a β vector 760 is then selected from the set of numerical β vectors 716, 726, and 736 (each including a numerical value μ and an uncertainty, represented by, for example, a standard deviation α) based on the actual numerical predicate 704 of the input training numerical triple using a numerical prediction task selector 750. The selected β vector thus represents the numerical value and uncertainty prediction by a numerical prediction task of the multiple numerical prediction tasks corresponding to the input numerical predicate. The predicted numerical value in the β vector 760 may then be compared to the actual numeral 706 of the input training triple (as a label) to calculate and generate a regression numerical loss, as shown by 770 and 780. For example, such numerical loss may be calculated as a Bayesian regression loss. Such loss is aggregated with numerical prediction losses from other training numerical triples and minimized during the optimization of the overall loss function described above during the joint training process of the numerical pipeline and the symbolic pipeline.

Figure 8:
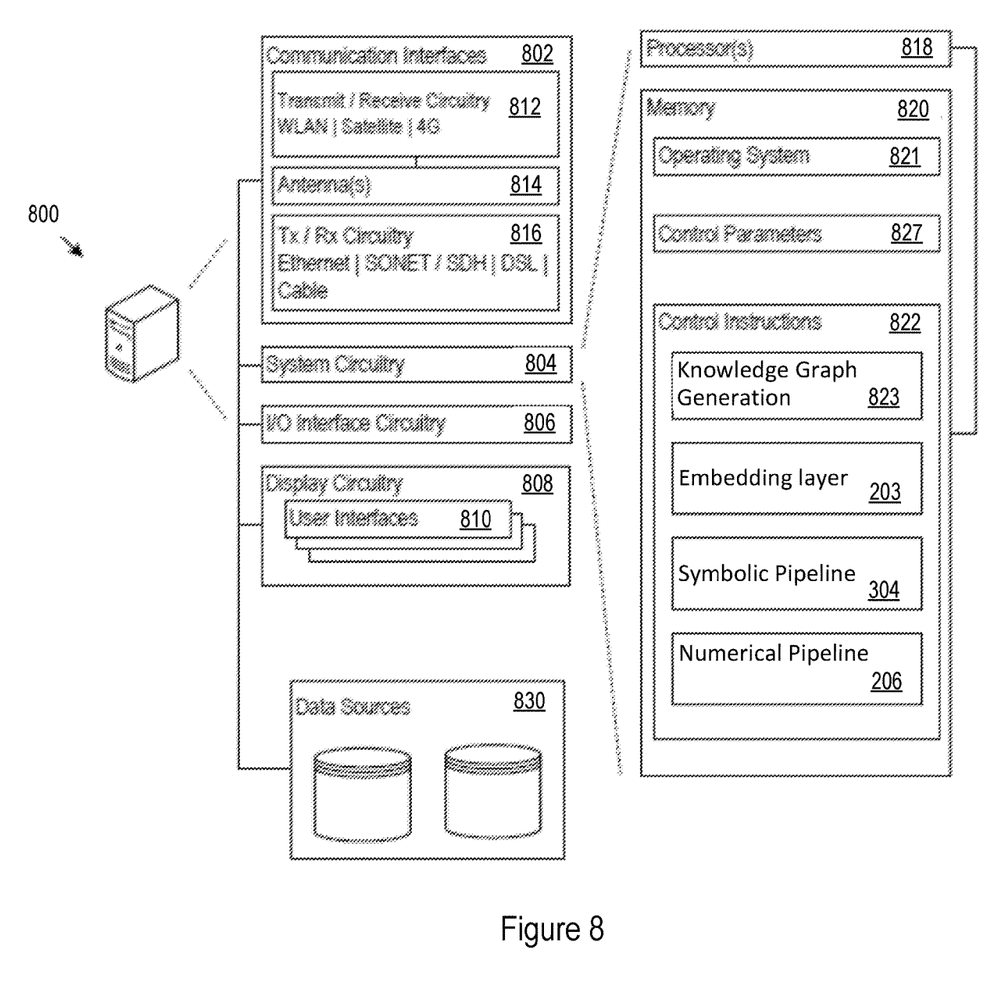
FIG. 8 is a block diagram illustrating an example architecture for a computer device for implementing the exemplary knowledge graph prediction systems and methods shown in FIGS. 2-7.

FIG. 8 illustrates a computer architecture of a computer device 800 on which the training and application of the knowledge graph prediction system and method may be implemented. The computer device 800 includes communication interfaces 802, system circuitry 804, input/output (I/O) interface circuitry 806, and display circuitry 808. The graphical user interfaces (GUIs) 810 displayed by the display circuitry 808 may be representative of GUIs generated by the knowledge graph prediction system to present or request information. The GUIs 810 may be displayed locally using the display circuitry 808, or for remote visualization, e.g., as HTML, JavaScript, audio, and video output for a web browser running on a local or remote machine.

The GUIs 810 and the I/O interface circuitry 806 may include touch sensitive displays, voice or facial recognition inputs, buttons, switches, speakers and other user interface elements. Additional examples of the I/O interface circuitry 806 includes microphones, video and still image cameras, headset and microphone input/output jacks, Universal Serial Bus (USB) connectors, memory card slots, and other types of inputs. The I/O interface circuitry 806 may further include magnetic or optical media interfaces (e.g., a CDROM or DVD drive), serial and parallel bus interfaces, and keyboard and mouse interfaces.

The communication interfaces 802 may include wireless transmitters and receivers (herein, "transceivers") 812 and any antennas 814 used by the transmit-and-receive circuitry of the transceivers 812. The transceivers 812 and antennas 814 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 802 may also include serial interfaces, such as universal serial bus (USB), serial ATA, IEEE 1394, lighting port, $I^2C$, slim Bus, or other serial interfaces. The communication interfaces 802 may also include wireline transceivers 816 to support wired communication protocols. The wireline transceivers 816 may provide physical layer interfaces for any of a wide range of communication protocols, such as any type of Ethernet, optical networking protocols, data over cable service interface specification (DOCSIS), digital subscriber line (DSL), Synchronous Optical Network (SONET), or other protocol.

The system circuitry 804 may include any combination of hardware, software, firmware, APIs, and/or other circuitry. The system circuitry 804 may be implemented, for example, with one or more systems on a chip (SoC), application specific integrated circuits (ASIC), microprocessors, discrete analog and digital circuits, and other circuitry. The system circuitry 804 may implement any desired functionality of the knowledge graph prediction system. As just one example, the system circuitry 804 may include one or more instruction processor 818 and memory 820.

The memory 820 stores, for example, control instructions 822 for executing the features of the knowledge graph prediction system, as well as an operating system 821. In one implementation, the processor 818 executes the control instructions 822 and the operating system 821 to carry out any desired functionality for training or executing the knowledge graph prediction system, in including its embedding layer 203, the symbolic pipeline 204, and the numerical pipeline 206. The memory 820 additionally stores control instructions 822 for data processing and analytics 823 needed for generating the knowledge graph and triples therein from various data sources.

The computer device 800 may further include various data sources 830. Each of the databases that are included in the data sources 830 may be accessed by the knowledge graph prediction system to obtain data for consideration during any one or more of the processes described herein.

The present disclosure may be embodied in various forms, including a system, a method, a computer readable medium, or a platform-as-a-service (PaaS) product for predicting or identifying missing links and missing numeric values in knowledge graphs with uncertainty estimates based on a multi-task learning architecture.

In some implementations of this disclosure, a method for predicting links between entities is disclosed. The method includes receiving a knowledge graph where the knowledge graph includes one or more nodes with a numerical value and one or more nodes with a non-numerical value. The method further includes converting the knowledge graph to a vector embedding space; for the non-numerical value node embeddings, determining a non-numeric loss value; for the numerical value node embeddings, determining a predicted distribution value of linked numerical nodes; for the numerical value node embeddings, determining a numeric loss value based on the predicted distribution value and an actual value of the linked numerical nodes; determining an aggregate loss value based on the non-numeric loss value and the numeric loss value; obtaining a trained predictive model based on the aggregate loss value; receiving a user input request; determining a likelihood score of a link between nodes based on the trained predictive model and the user input request; and determining a likelihood score of a distribution value of a linked numerical node based on the trained predictive model and the user input request.

In the implementations above, the predicted distribution value of each linked numerical node is determined using a neural network based on a subject node embedding and a predicate embedding of the knowledge graph. In any of the implementations above, the predicted distribution value of each linked numerical node is determined using a cross stitching approach in the neural network. In any of the implementations above, the method may further include minimizing the aggregate loss value using a machine learning model, and the trained predictive model is obtained based on the minimized aggregate loss value. In any of the implementations above, the user input request is received in the form of a subject-predicate-object triple.

In some implementations, a method for predicting edges and numerical values in a knowledge base is disclosed. The method may include receiving a knowledge graph comprising a set of entities, a set of numerical values, a set of symbolic predicates, and a set of numerical predicates stored in the form of a collection of symbolic triples and a collection of numerical triples in forms of (entity, symbolic predicate, entity) and (entity, numerical predicate, numerical value), representing known associations within the set of entities, and between the set of entities and the set of numerical values, respectively. The method further include receiving a pre-trained predictive model comprising an embedding layer for mapping the set of entities and the set of symbolic predicates into embedding vectors in an embedding space having a predefined dimensions; and a symbolic predictive pipeline and a numerical predictive pipeline arranged in parallel and sharing the embedding layer as input. The method further includes predicting a new symbolic triple using the embedding layer and the symbolic predictive pipeline; and predicting a new numerical triple containing a new numerical value with a numerical prediction uncertainly using the embedding layer and the numerical predictive pipeline.

In the implementations above, the pre-trained predictive model further includes a pipeline selector for directing an input to the pre-trained predictive model to either the symbolic predictive pipeline or the numerical predictive pipeline.

In any of the implementations above, the symbolic predictive pipeline comprises one or more scoring layers for computing a score of a symbolic triple in the embedding space.

In any of the implementations above, the method further include receiving a pair of entities of the set of entities; identifying a pair of embedding vectors in the embedding space for the pair of entities using the embedding layer; and processing the pair of embedding vectors using the symbolic predictive pipeline to identify a symbolic predicate among the set of symbolic predicates to form the new symbolic triple with the pair of entities.

In any of the implementations above, the method may further include determining a transposition between the pair of embedding vectors in the embedding space; and identifying one of the set of symbolic predicates having an embedding vector matching the transposition with less than a predetermined mismatch threshold as the symbolic predicate for forming the new symbolic triple.

In any of the implementations above, the method may further include receiving a candidate symbolic triple outside of the collection of symbolic triples; identifying embedding vectors in the embedding space for the candidate symbolic triple using the embedding layer; processing the embedding vectors using the symbolic predictive pipeline to determine a score of the candidate symbolic triple; and identifying the candidate symbolic triple as the new symbolic triple when the score if above a predetermined plausibility threshold.

In any of the implementations above, the method may further include determining a transposition between a subject embedding vector and an object embedding vector among the embedding vectors of the candidate symbolic triple in the embedding space; and determining a degree of matching between the transposition and a predicate embedding vector among the embedding vectors of the candidate symbolic triple as the score of the candidate symbolic triple.

In any of the implementations above, the numerical predictive pipeline comprises a plurality of parallel neural networks corresponding to a plurality of predictive tasks each associated with one of the set of numerical predicates.

In any of the implementations above, each of the plurality of parallel neural networks comprises a set of pre-trained weight parameters for a corresponding numerical predicate.

In any of the implementations above, each of the plurality of parallel neural networks is configured to process an input entity in the embedding space using the set of pre-trained weight parameters for a numerical prediction.

In any of the implementations above, the numerical predictive pipeline further comprises a cross stitch neural network for information sharing among the plurality of parallel neural networks.

In any of the implementations above, the method may further include receiving a pair of an entity and a numerical predicate; identifying an embedding vector in the embedding space for the entity using the embedding layer; processing the embedding vector and the numerical predicate using one of the plurality of parallel neural networks associated with the numerical predicate, and the cross stitch neural network to generate the new numerical value and the numerical prediction uncertainty; and identifying the new numerical triple as containing the entity, the numerical predicate, and the new numerical value.

In any of the implementations above, the method may further include receiving an entity among the set of entities; identifying an embedding vector in the embedding space for the entity using the embedding layer; and processing the embedding vector using one or more of the parallel neural networks corresponding to one or more numerical predicates and the cross stitch neural network to generate one or more numerical values associated with the one or more numerical predicates with corresponding numerical prediction uncertainties; and selecting one of the one or more numerical values to form the new numerical triple according to the numerical prediction uncertainties.

In any of the implementations above, the embedding vectors of the set of entities and the set of symbolic predicates in the embedding space, and other model parameters of the symbolic predictive pipeline, and the numerical predictive pipeline are jointly trained using a training triple set from the collection of symbolic triples and the collection of numerical triples.

In any of the implementations above, the embedding vectors of the set of entities and the set of symbolic predicates in the embedding space, and other model parameters of the symbolic predictive pipeline and the numerical predictive pipeline are jointly trained by optimizing a joint loss function comprising a weighted sum of a symbolic loss function and a numerical loss function.

In any of the implementations above, the embedding vectors of the set of entities and the set of symbolic predicates in the embedding space, and other model parameters of the symbolic predictive pipeline and the numerical predictive pipeline are jointly trained by optimizing a joint loss function based on a stochastic gradient descent.

While the present disclosure has been particularly shown and described with reference to the example embodiments thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A method for predicting links between entities comprising:
   receiving a knowledge graph, the knowledge graph including one or more nodes with a numerical value and one or more nodes with a non-numerical value;
   converting the knowledge graph to a vector embedding space;
   for non-numerical value node embeddings, determining a non-numeric loss value;
   for numerical value node embeddings, determining a predicted distribution value of linked numerical nodes using a cross stitching approach in a neural network based on a subject node embedding and a predicate embedding of the knowledge graph;
   for the numerical value node embeddings, determining a numeric loss value based on the predicted distribution value and an actual value of the linked numerical nodes;
   determining an aggregate loss value based on the non-numeric loss value and the numeric loss value;
   obtaining a trained predictive model based on the aggregate loss value;
   receiving a user input request;
   determining a likelihood score of a link between nodes based on the trained predictive model and the user input request; and
   determining a likelihood score of a distribution value of a linked numerical node based on the trained predictive model and the user input request.

2. The method of claim 1, wherein the method comprises the step of minimizing the aggregate loss value using a machine learning model, and the trained predictive model is obtained based on the minimized aggregate loss value.

3. The method of claim 1, wherein the user input request is received in a form of a subject-predicate-object triple.

4. A method for predicting links between entities comprising:
   receiving a knowledge graph, the knowledge graph including one or more nodes with a numerical value and one or more nodes with a non-numerical value;
   converting the knowledge graph to a vector embedding space;
   for non-numerical value node embeddings, determining a non-numeric loss value;
   for numerical value node embeddings, determining a predicted distribution value of linked numerical nodes;
   for the numerical value node embeddings, determining a numeric loss value based on the predicted distribution value and an actual value of the linked numerical nodes;
   determining an aggregate loss value based on the non-numeric loss value and the numeric loss value;
   obtaining a trained predictive model based on the aggregate loss value;
   receiving a user input request;
   determining a likelihood score of a link between nodes based on the trained predictive model and the user input request; and
   determining a likelihood score of a distribution value of a linked numerical node based on the trained predictive model and the user input request,
   wherein the trained predictive model comprises a symbolic predictive pipeline and a numerical predictive pipeline and wherein the trained predictive model further includes a pipeline selector for directing the user input request to either the symbolic predictive pipeline or the numerical predictive pipeline.

5. The method of claim 4, further comprising:
   receiving a pair of nodes in the user input request;
   identifying a pair of embedding vectors in the vector embedding space for the pair of nodes; and
   processing the pair of embedding vectors using the symbolic predictive pipeline to identify a symbolic predicate to form a new symbolic triple with the pair of nodes.

6. The method of claim 5, further comprising:
   determining a transposition between the pair of embedding vectors in the vector embedding space; and
   identifying a symbolic predicates having an embedding vector matching the transposition with less than a predetermined mismatch threshold as the symbolic predicate for forming the new symbolic triple.

7. The method of claim 4, wherein the numerical predictive pipeline comprises a plurality of parallel neural networks corresponding to a plurality of predictive tasks each associated with one of a set of numerical predicates.

8. The method of claim 7, wherein each of the plurality of parallel neural networks comprises a set of pre-trained weight parameters for a corresponding numerical predicate.

9. The method of claim 8, wherein each of the plurality of parallel neural networks is configured to process an input entity in the vector embedding space using the set of pre-trained weight parameters for a numerical prediction.

10. The method of claim 9, wherein the numerical predictive pipeline further comprises a cross stitch neural network for information sharing among the plurality of parallel neural networks.

11. The method of claim 10, further comprising:
receiving a pair of a node and a numerical predicate from the user input request;
identifying an embedding vector in the vector embedding space for the node; and
processing the embedding vector and the numerical predicate using one of the plurality of parallel neural networks associated with the numerical predicate, and the cross stitch neural network for determining the likelihood score of the distribution value of the linked numerical node.

12. The method of claim 4, wherein the vector embedding space, and other model parameters of the symbolic predictive pipeline, and the numerical predictive pipeline are jointly trained using a training triple set from a collection of symbolic triples and a collection of numerical triples of the knowledge graph.

13. A system for predicting links between entities comprising a memory for storing instructions, and a processor in communication with the memory, wherein the processor, when executing the instructions, is configured to:
receive a knowledge graph, the knowledge graph including one or more nodes with a numerical value and one or more nodes with a non-numerical value;
convert the knowledge graph to a vector embedding space;
for non-numerical value node embeddings, determine a non-numeric loss value;
for numerical value node embeddings, determine a predicted distribution value of linked numerical nodes using a cross stitching approach in a neural network based on a subject node embedding and a predicate embedding of the knowledge graph;
for the numerical value node embeddings, determine a numeric loss value based on the predicted distribution value and an actual value of the linked numerical nodes;
determine an aggregate loss value based on the non-numeric loss value and the numeric loss value;
obtain a trained predictive model based on the aggregate loss value;
receive a user input request;
determine a likelihood score of a link between nodes based on the trained predictive model and the user input request; and
determine a likelihood score of a distribution value of a linked numerical node based on the trained predictive model and the user input request.

14. The system of claim 13, wherein the processor, when executing the instructions, is configured to minimize the aggregate loss value using a machine learning model, and the trained predictive model is obtained based on the minimized aggregate loss value.

15. The system of claim 13, wherein the user input request is received in a form of a subject-predicate-object triple.

* * * * *